May 1, 1951     H. G. VORE     2,551,477
CAPPING MACHINE WITH CAP HEATING AND CAP TRANSFER MEANS
Filed March 9, 1949     6 Sheets-Sheet 1
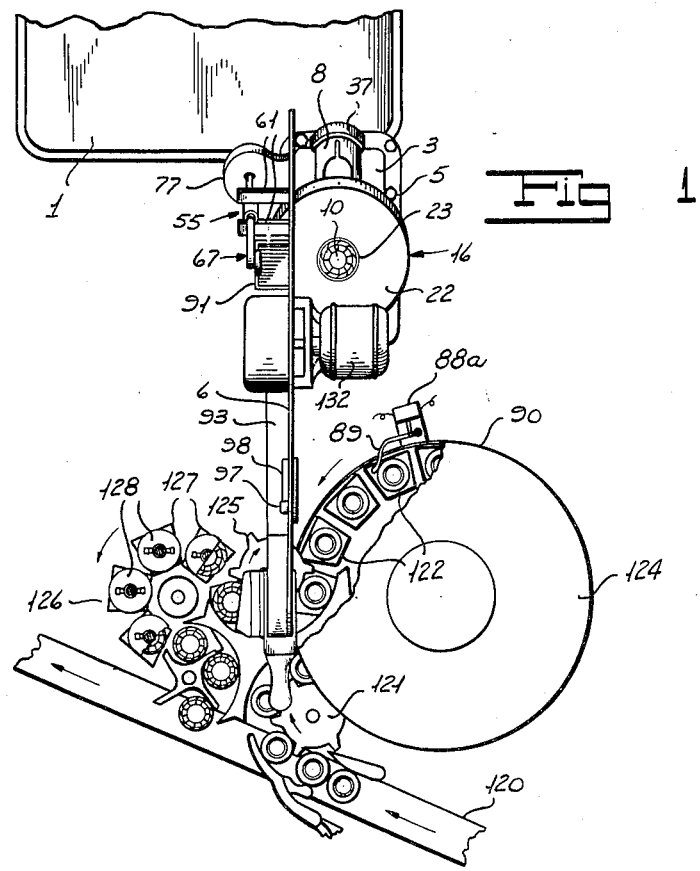
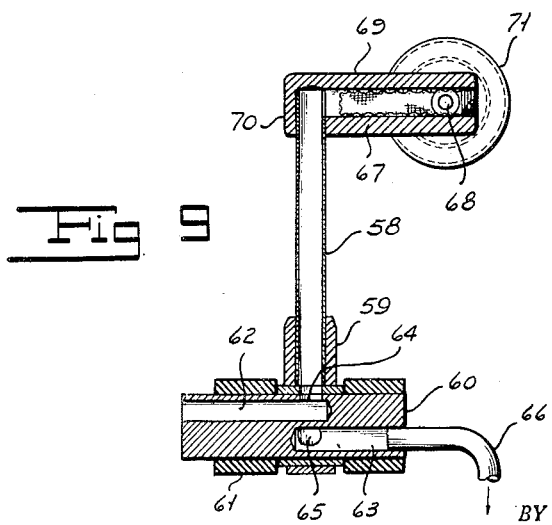
INVENTOR.
HERBERT G. VORE
BY
ATTORNEY

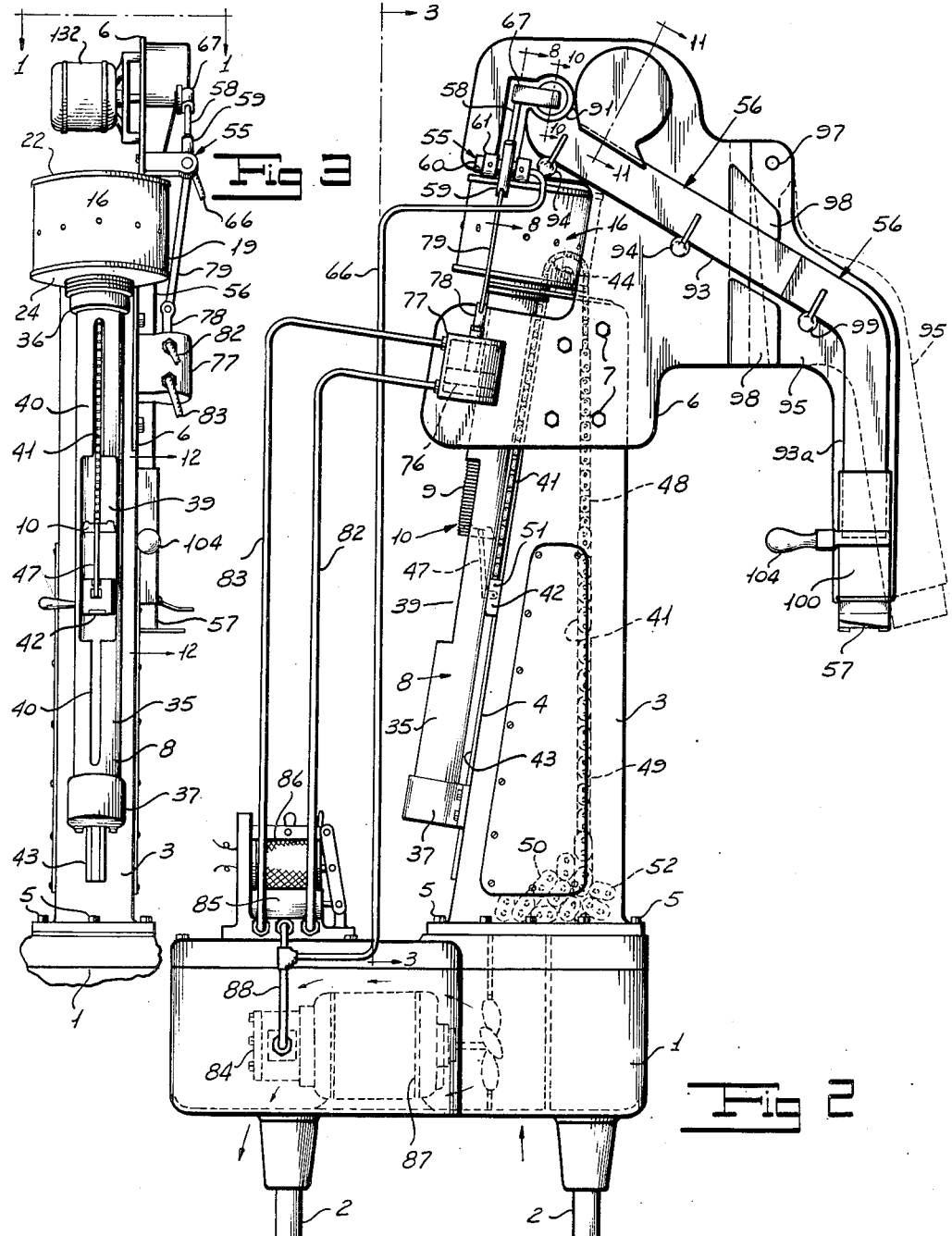

May 1, 1951 H. G. VORE 2,551,477
CAPPING MACHINE WITH CAP HEATING AND CAP TRANSFER MEANS
Filed March 9, 1949 6 Sheets-Sheet 3
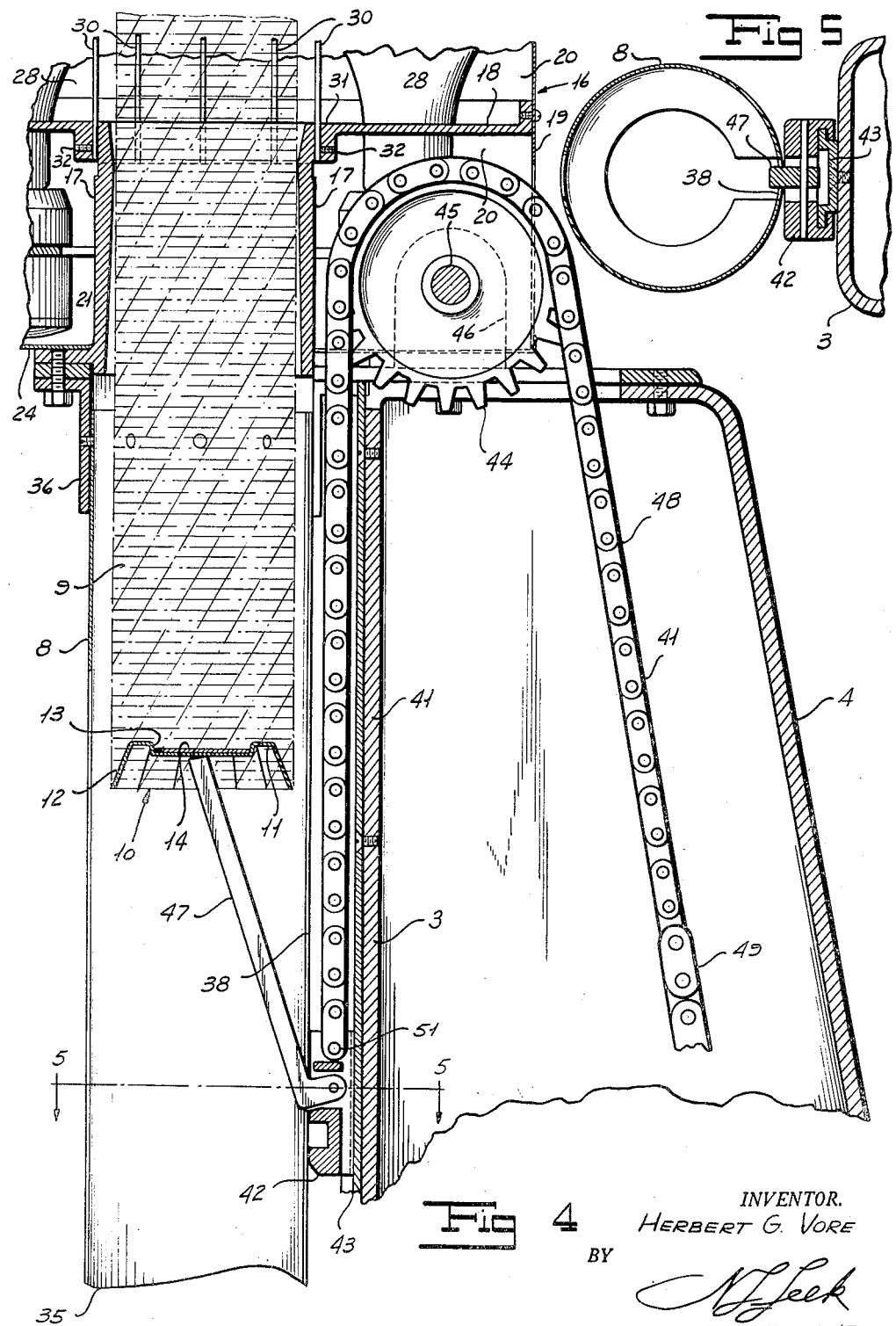
INVENTOR.
HERBERT G. VORE
BY
ATTORNEY

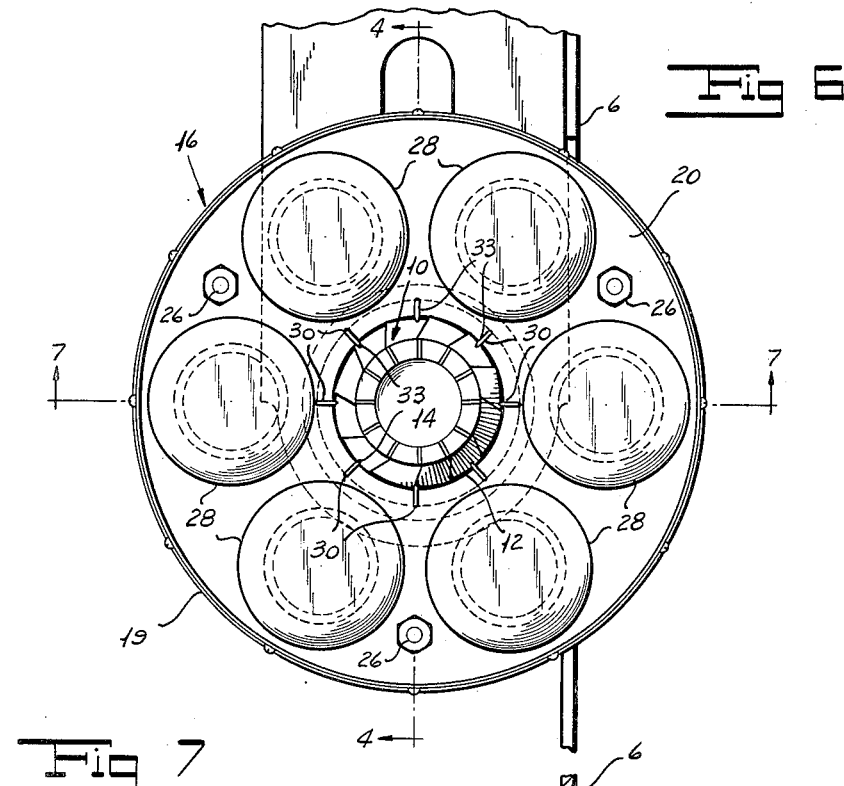
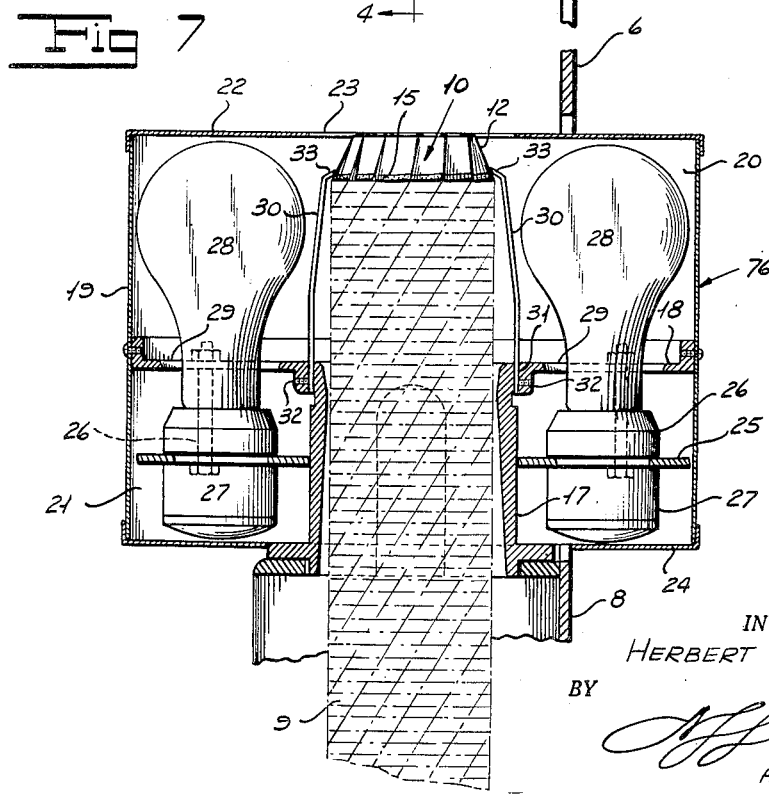

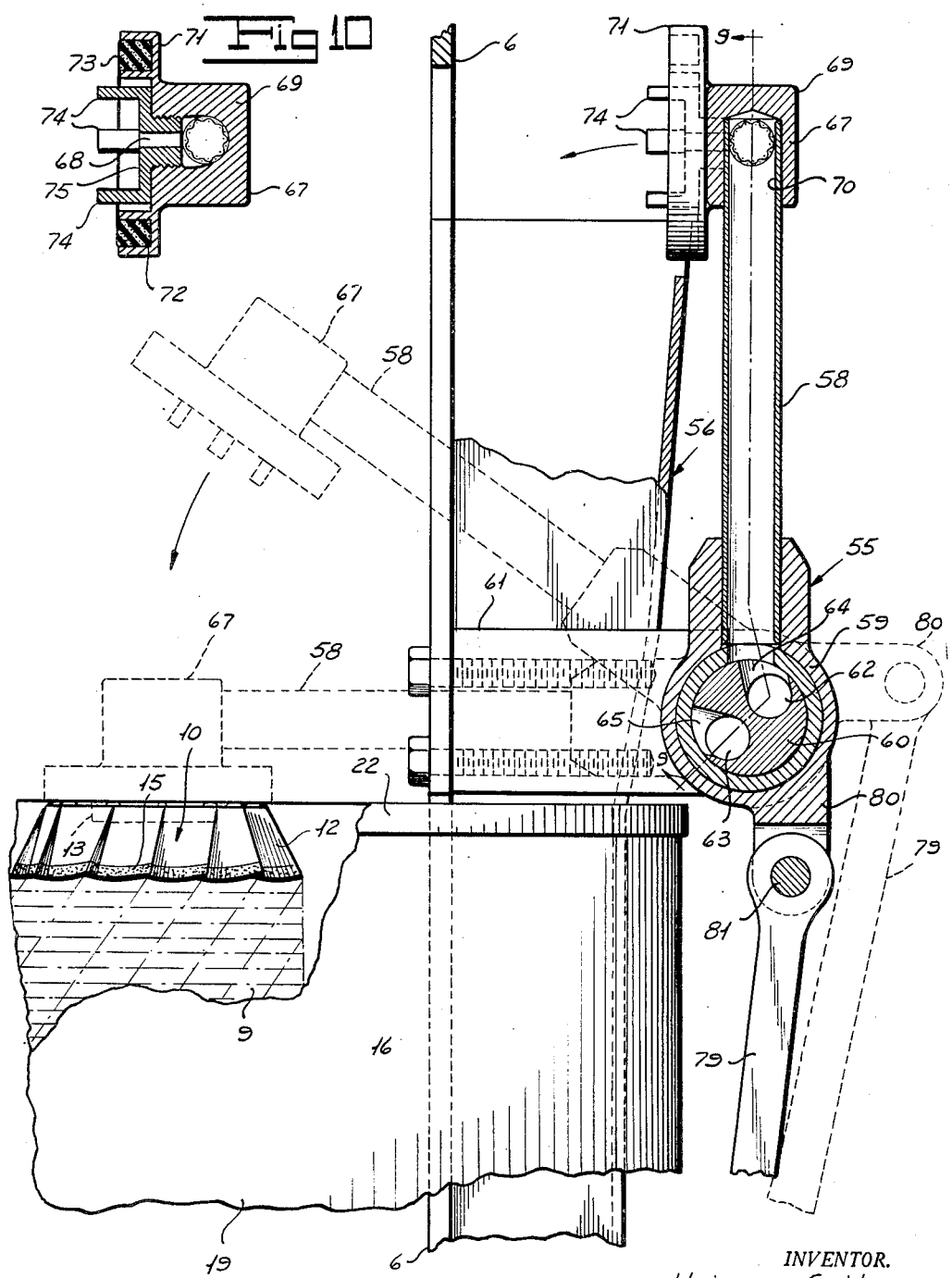

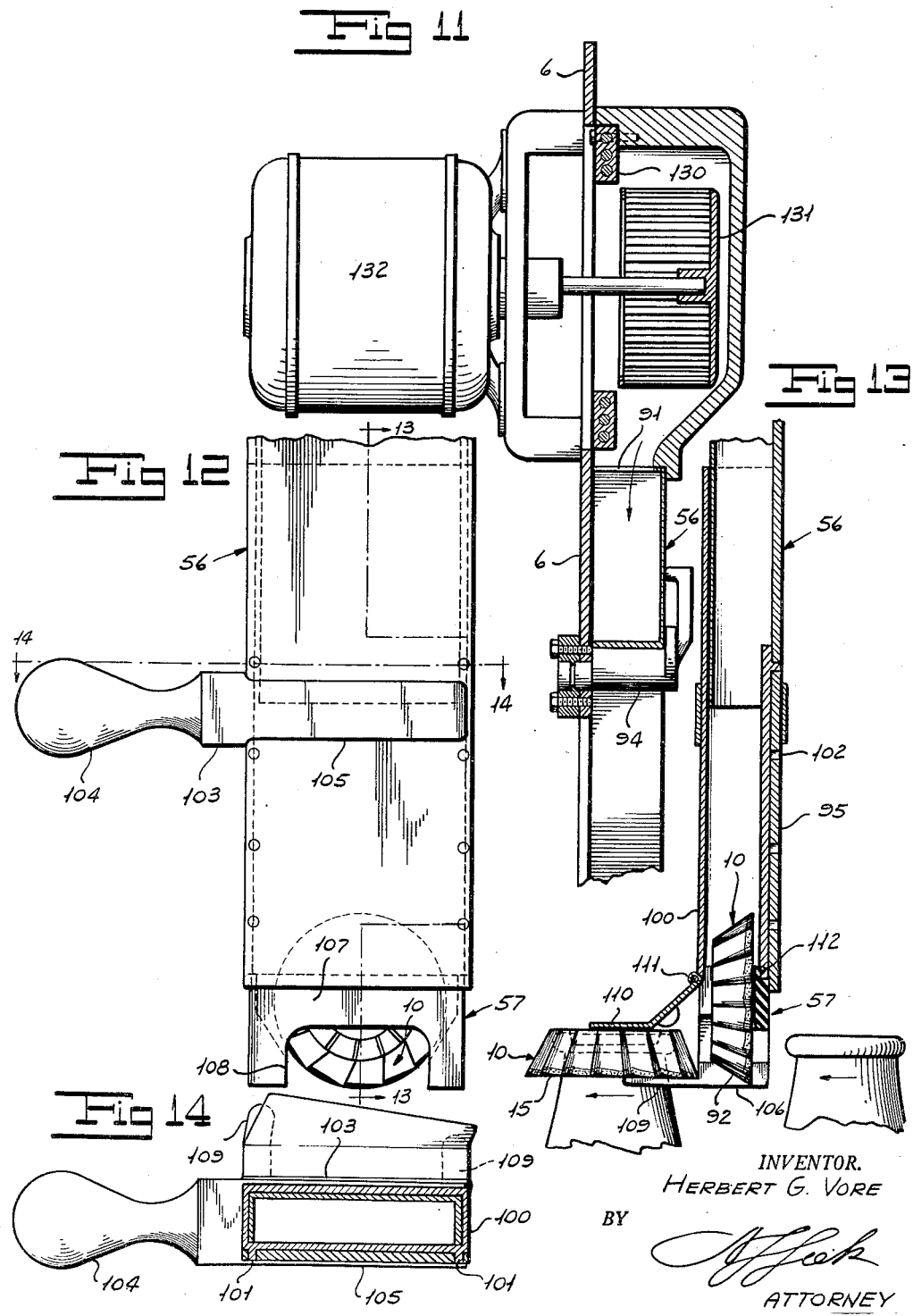

Patented May 1, 1951

2,551,477

UNITED STATES PATENT OFFICE 2,551,477

CAPPING MACHINE WITH CAP HEATING AND CAP TRANSFER MEANS

Herbert G. Vore, Forest Hills, N. Y., assignor to American Seal-Kap Corporation of Delaware, Wilmington, Del., a corporation of Delaware Application March 9, 1949, Serial No. 80,373

9 Claims. (Cl. 226—88.1)

This invention relates to a machine for applying flexible skirted hood caps to the mouth of milk bottles. It is especially adapted for applying and sealing hood caps having a pleated skirt which is in whole or in part coated with a thermoplastic adhesive which requires heat and pressure for sealing it about the mouth and pouring lip of a milk bottle. Such a cap is shown and described in Patent No. 2,325,168 issued on July 27, 1943 to the American Seal-Kap Corporation on an application of Herbert G. Vore.

This machine is especially adapted for use in smaller dairies whose total volume of business is such that it does not justify the installation of one of the more complicated and expensive high speed machines of this type which is available today.

The principal object of the invention is to provide a simple and efficient machine of this type which is relatively cheap to manufacture and which can be used in conjunction with standard filling and capping machines in use at the present time.

Another object of the invention is to provide novel and improved means for heating the skirts of the caps in order to soften the adhesive applied thereto.

Still another object of the invention is to provide novel and efficient means for successively presenting unheated caps to the heating means as heated caps are withdrawn therefrom.

Another object of the invention is to provide an improved mechanism for successively supplying caps of this type to a capping station with the adhesive on the skirts thereof heated and softened in condition for sealing about the pouring lips of milk bottles.

Other and more limited objects of the invention will be apparent from the following specification and the accompanying drawings forming a part thereof wherein:

Fig. 1 is a plan view showing my improved apparatus applied to a standard filling and capping machine;

Fig. 2 is a front elevation of my improved apparatus;

Fig. 3 is an end elevation thereof looking towards the left side of the apparatus as viewed in Fig. 1;

Fig. 4 is a fragmentary vertical sectional view through the cap reservoir and the mechanism for successively presenting caps to the heating means as caps are withdrawn therefrom;

Fig. 5 is a horizontal section taken on the line 5—5 of Fig. 4;

Fig. 6 is a top plan view of the cap reservoir and the cap heating mechanism carried thereby the cover of the heating mechanism being removed;

Fig. 7 is a vertical sectional view taken on the line 7—7 of Fig. 6;

Fig. 8 is a side elevation partially in section showing the mechanism for successively transferring heated caps from the top of the stack of caps in the heating mechanism and depositing them in the cap chute by which they are delivered to a cap applying station;

Fig. 9 is a section taken on the line 9—9 of Fig. 8;

Fig. 10 is a central section through the suction head by which the caps are gripped and transferred from the heating mechanism to the cap chute;

Fig. 11 is a fragmentary section through the heater and blower by which the cap chute is heated, the plane of the section being indicated by the line 11—11 of Fig. 2;

Fig. 12 is a fragmentary enlarged front elevation of the lower discharge end of the cap delivery chute;

Fig. 13 is a vertical section taken on the line 13—13 of Fig. 12; and

Fig. 14 is a horizontal section taken on the line 14—14 of Fig. 12.

My improved machine includes a hollow base on which is mounted an upwardly extending column to which is secured a cap reservoir, a heater for heating and softening a thermoplastic adhesive around the cap skirts, a cap applying means, a chute by which heated caps are delivered to the cap applying means and a transfer mechanism by which heated caps are successively withdrawn from the heater and deposited in the delivery chute. The heater is disposed about the upper end of the cap reservoir and gravity-operated means is provided to feed the caps upwardly in the reservoir as caps are successively withdrawn from the top of the stack of caps and deposited in the delivery chute.

The transfer mechanism comprises a suction head which is mounted on the end of a pivoted arm which is adapted to be oscillated back and forth between the heater and the delivery chute. The arm is oscillated through the medium of a suction-operated piston in a cylinder secured to the column. A motor-operated vacuum pump mounted in the hollow base provides the suction for operating both the pivoted arm and the suction head, and a solenoid-operated valve controls the operation thereof. The solenoid is energized by the momentary closing of a switch by successive bottles as they pass the switch which is mounted at a predetermined place on the bottle filling mechanism. The suction to the suction head is controlled by the oscillation of the pivoted arm on which it is mounted. As the suction head approaches the top of the stack of caps in the heater, suction is automatically applied to the suction head causing it to grasp and hold the top cap as it is engaged by the suction head. The arm then carries the suction head with the cap back over the chute where the suction is automatically released allowing the cap to drop from the suction head into the chute. This operation is successively repeated each time the solenoid is energized by the closing of the switch by successive bottles as they pass the switch while being filled. With this arrangement each bottle initiates the withdrawal of its own cap from the heater.

The machine is adapted for use with any standard bottle filling and capping mechanism wherein the bottles are filled while traversing a circular path and are then automatically transferred by suitable mechanism to a capping head. The cap applying means of my machine is operated in conjunction with the bottle transfer mechanism to loosely apply caps to successive filled bottles as they are being transferred from the filler to the capping mechanism. The capping mechanism then firmly secures the caps in and about the mouth and pouring lip of the bottles. Such an arrangement is shown in the patent to Goodwin et al. No. 2,325,163.

Referring now to the drawings by reference characters the numeral 1 indicates a hollow base which is supported by suitable legs 2 which are preferably adjustable in order to accommodate the apparatus to different standard filling and capping machines. A hollow column 3 having one side thereof inclined as indicated at 4 is secured to the top of the base 1 by bolts 5 and extends upwardly therefrom. A plate 6 is secured to the column 3 adjacent the upper end thereof by bolts 7, and an upwardly extending cylindrical cap reservoir 8 which is adapted to slidably support a stack 9 of nested caps 10 is secured to the inclined side 4 of the column 3.

Each of the caps 10 comprises a top 11 and an annular pleated skirt 12 extending downwardly therefrom. The top 11 is depressed to form a centrally disposed circular recess 13 in which is secured a disc 14 which replaces the usual plug disc used to close the mouth of a bottle. A band of thermoplastic adhesive 15 which is dry and hard at atmospheric temperature is applied to the outer surface of the skirt 12 around the lower portion thereof.

A heater, generally indicated by the numeral 16, which is adapted to heat the thermoplastic band of adhesive 15 until it becomes soft and tacky is mounted above the upper end of the reservoir 8. This heater comprises an open cylindrical support 17 which is disposed in axial alignment with the reservoir 8 and has an annular flange 18 integral therewith around the upper end thereof. An annular casing 19 is secured about the flange 18 and extends above and below the flange 18 forming upper and lower chambers 20 and 21 respectively. The top of the upper chamber 20 is closed by a cover 22 which has a central opening 23 therethrough in axial alignment with the support 17 and reservoir 8. The bottom of the lower chamber 21 is closed by a disc 24 surrounding the lower end of the support 17. An annulus 25 surrounding the support 17 is disposed within the lower chamber 21 and is adjustably supported therein by a plurality of bolts 26 which are secured to and extend downwardly from the flange 18 into the chamber 21. The annulus 25 has secured thereto a plurality of electric sockets 27 in each of which is mounted an electric light bulb 28. The bulbs 28 extend up through openings 29 in the flange 17 into the upper chamber 20. A plurality of equally spaced spring fingers 30 are mounted about the upper open end of the support 17 in suitable apertures 31, and are removably secured therein by set screws 32. The fingers 30 extend upwardly within the chamber 20 and terminate slightly below the top 22. The upper ends of the fingers 30 are turned radially inwardly a short distance as indicated at 33. The inturned ends 33 of the fingers are adapted to releasably engage and hold the top cap of the stack of caps 9 which extends up into the upper chamber 20. As the caps 10 are successively withdrawn from the top of the stack 9, for application to bottles, the stack 9 is moved upwardly by suitable mechanism to bring the next succeeding cap into engagement with the inturned ends 33 of the fingers 30. After the caps 10 emerge from the upper end of the support 17 they are heated by the bulbs 28 as radiant heat from the caps travels upwardly in the chamber 20. By the time the caps 10 successively reach the ends 33 of the fingers 30 the skirts thereof have been heated sufficiently to soften and render tacky the thermoplastic adhesive band 15 around the bottoms thereof. The caps are then in proper condition to be applied to bottles.

The cap reservoir 8 comprises an elongated tube 35 which is mounted in upper and lower brackets 36 and 37 respectively which are bolted to the inclined side 4 of the column 3. The tube 35 is slotted at the rear thereof from end to end adjacent the wall 4 as indicated at 38. The front mid-section of the tube 35 is cut away, as indicated at 39, to provide an opening through which caps may be inserted into the reservoir, and the tube 35 is also slotted above and below the cutaway section 39, as indicated at 40, to provide a sight through which the caps are visible, so that one can tell at a glance how many caps are in the reservoir. The heater 16 is also secured to and supported by the upper bracket 36.

The means through which the caps are fed upwardly from the reservoir 8 and through the heater 16 as they are successively withdrawn from the heater includes a gravity-operated mechanism. This mechanism comprises a suspended weighted means which becomes progressively lighter as the stack of caps is depleted and becomes lighter. As shown herein this mechanism comprises a chain 41 which has one end thereof secured to a slide 42 which is slidably mounted upon a suitable guide 43 secured to the column 3 diametrically opposite the slot 38 in the tube 35 of the reservoir 8. The guide extends the entire length of the tube 38 and terminates adjacent a sprocket 44 which is rotatably mounted upon a shaft 45 carried by suitable brackets 46 secured to the top of the column 3. The chain 41 extends upwardly from the slide 42, along the front of the guide 43 and over the sprocket 44 and from the sprocket 44 is suspended downwardly within the hollow column 3, as clearly shown in Figs. 2 and 4. The slide 42 carries a pivoted finger 47, which normally swings by gravity through the slot 38 into the tube 35 in position for the free end thereof to engage beneath the bottom cap 10 of the stack of caps 9, as shown in Figs. 2 and 4. The chain 41 is constructed to become progressively heavier from one end to the other end thereof and, as shown herein, comprises three sections, 48, 49 and 50. The section 48 is pivotally secured to the slide 42, as indicated at 51. The section 49, which is disposed between the sections 48 and 50, is heavier than the section 48 and lighter than the section 50. The weight of the suspended chain 41 urges the slide 42 upwardly upon the guide 43 and with it the pivoted finger 47. The finger 47 in turn urges the caps upwardly within the reservoir 8 with sufficient force to maintain the top cap of the stack 9 in engagement with the inturned ends 33 of the fingers 30, as successive caps are withdrawn from the top of the stack. However, the parts are so adjusted and balanced that the caps cannot be forced beyond the fingers 30 thereby, but must be withdrawn by the transfer mechanism. As the caps are moved upwardly in the reservoir 8 the chain 41 will move downwardly in the column 3 proportionate to the upward movement of the stack of caps in the reservoir 8. When the reservoir 8 is completely filled with caps the lower end of the section 50, of the chain 41, just touches the top of the base 1. As the caps are moved upwardly in the reservoir 8 the chain moves downwardly within the column 3, and as the chain moves downwardly it nests and rests upon the base 1, as shown at 52 in Fig. 2. From this it will be seen that as the caps are moved upwardly the suspended weight of the chain becomes lighter and lighter, as more and more chain comes to rest upon the base 1. After the entire section 50 has moved down to rest upon the base 1, only the section 49 and the downwardly suspended portion of the section 48 in the column 3 exert upward force upon the caps. After the section 50 of the chain has moved down to rest upon the base 1, then upon further movement of the stack of caps the section 49 will start coming to rest upon the base 1. Consequently, as the caps are moved upwardly in the reservoir 8 by the suspended weight of the chain 41, the suspended weight of the chain 41 will become progressively lighter, as the stack of caps becomes shorter and consequently lighter. From this it will be seen that as the top caps of the stack are successively withdrawn from beneath the fingers 30, the next succeeding cap will be brought up into position to be grasped and withdrawn on the next oscillation of the cap transfer mechanism.

As the caps leave the upper end of the frame 17 and enter the chamber 20 they are subjected to a band of radiant heat from the light bulbs 28. The depth of the chamber 20 and the intensity of the bulbs 28 is such that by the time the caps reach the top of the stack the band 15 of the adhesive material has been exposed to the radiant heat of the bulbs for a sufficient time to render the band 15 soft and tacky in condition to be applied to the bottles. By heating the skirts of the caps by radiant heat from an annular series of bulbs disposed as shown in Figs. 6 and 7, I am enabled to turn on and off the heat practically instantaneously, so that I have full heat the minute the bulbs are energized and have practically no heat as soon as the bulbs are de-energized.

As the caps reach the top of the stack beneath the inturned ends 33, of fingers 30, they are grasped and removed therefrom by a transfer mechanism, generally indicated by the numeral 55, and deposited in a downwardly inclined chute, generally indicated by the numeral 56, by which they are delivered to a cap supporting head 57 at a cap applying station. The transfer mechanism 55 comprises a hollow arm 58 which is secured to a socket 59 which is pivotally mounted upon a stationary shaft 60 secured in suitable bearings 61 bolted to the plate 6. The hollow shaft 60 has two longitudinal bores 62 and 63 therein which communicate with transverse bores 64 and 65 respectively. The other end of the bore 62 is open to the atmosphere, and the other end of the bore 63 communicates with a conduit 66 through which suction is adapted to be applied. The transverse bores 64 and 65 are positioned to alternately communicate with the hollow arm 58 as the socket 59 and arm 58 are oscillated between the position shown in full lines and the position shown in dotted lines in Fig. 8. A suction head 67 is secured to the outer end of the arm 58 and has a central bore 68 therethrough which communicates with the interior of the hollow arm 58. The suction head 67 consists of a base 69 having a bore 70, into which the end of the arm 58 extends, and an annular flange 71. The flange 71 has an annular groove 72 therein in which is secured a ring of pliable material 73 of rubber or the like. Four prongs 74 are secured to and project outwardly from a ring 75 which is removably mounted in the base 79. The prongs 74 extend out beyond the ring 73, as clearly shown in Figs. 8 and 10, for the purpose to be hereinafter described.

The socket 59 and the arm 58 are adapted to be oscillated by a piston 76 slidably mounted within a cylinder 77 secured to the plate 6. The outer end of the piston rod 78 is pivotally secured to the lower end of a connecting rod 79 which has the upper end thereof pivotally connected to an arm 80 on the socket 59, as indicated at 81. As the piston 76 is reciprocated back and forth within the cylinder 77, the arm 58 and connected parts will be oscillated between the full lines and dotted lines in positions Fig. 8. The piston 76 is suction-operated through conduits 82 and 83 which are adapted to be alternately connected to a vacuum pump 84, and to the atmosphere, by a valve 85 which is opened and closed by a solenoid 86. The vacuum pump 84 is mounted within the hollow base 1 and is driven by a motor 87 also mounted within the base 1. The vacuum pump 84 is connected to the valve 85 by a conduit 88, to which the lower end of the conduit 66 is connected between the vacuum pump 84 and the valve 85. As the valve 85 is operated by the solenoid 86, the conduit 83 is first connected to the conduit 88 and the conduit 82 is vented to the atmosphere, and then the conduit 82 is connected to the conduit 88 and the conduit 83 vented to the atmosphere, so that suction is alternately applied to the conduits 82 and 83 to reciprocate the piston 76. The conduit 66 is always connected directly to the vacuum pump 84 through the conduit 88 so that suction is always applied to the bore 63 while the vacuum pump 84 is operating.

The solenoid 86 is adapted to be momentarily energized and de-energized by a switch 88a by successive bottles engaging the arm 89 thereof as they travel through the filling machine 90. The switch 88a is secured at a predetermined place on the filling machine 90, with the arm 89 projecting into the path of the bottles. As the bottle engages the arm 89 it closes the switch 88a which energizes the solenoid 86. As the solenoid 86 is energized it connects the conduit 83 to the vacuum pump through the conduit 88 and vents the conduit 82 to the atmosphere. Suction is then applied to the upper side of the piston 76, in the cylinder 77, causing it to move upwardly, which swings the arm 58 from the full line position in Fig. 8 down into engagement with the top of the top cap 10 in the heater 16. As the arm 58 is moved towards the top of the stack 9, the interior thereof is brought into communication with the transverse bore 65, which applies suction to the head 67. The pliable ring 73 engages the top of the cap 10 and the prongs 74 extend down into the recess 13 and engage the disc 14. The cap 10 is then pulled upwardly by suction against the suction head 67 with the prongs 74, preventing the disc 14 from being pulled out of the recess 13. Then as the solenoid 86 is de-energized the conduit 82 is connected to the vacuum pump 84 by the valve 85 and the conduit 83 vented to the atmosphere. This causes the piston 76 to move downwardly within the cylinder 77, swinging the arm 58 and the suction head 67 back to the full line position shown in Fig. 8. As the arm 58 moves back the interior thereof is moved out of communication with the transverse bore 65, cutting off the suction. However, there is still sufficient vacuum within the arm 58 and suction head 67 to hold the cap in the suction head, but as the arm 58 moves out of communication with the transverse bore 65 it moves into communication with the bore 64 and is vented to the atmosphere through the longitudinal bore 62, breaking the vacuum within the arm 58 and suction head 68 and releasing the cap. The cap then falls edgewise into the chute 56, through the open end 91 thereof, and then rolls down the chute 56 onto the cap support 57 secured to the lower end of the chute 56 and comes to rest in the position indicated at 92, as shown in Fig. 13, where it is adapted to be engaged by a bottle and withdrawn, as will be hereinafter described.

The cap chute 56 is composed of a downwardly inclined section 93 and a vertical section 93a with which the inclined section 93 registers. The section 93 is U-shape and is removably held against the plate 6 by clamps 94. The plate 6 thus forms one side-wall of the chute. A swinging plate 95 is pivotally secured to the plate 6 at 97 and is held in alignment with the plate 6 by lugs 98, which are secured to and project forwardly from the plate 6. The vertical section 93a of the chute 56 is also U-shape in cross section and is held in position against the plate 95 by a clamp 99, similar to the clamp 94, with the plate 95 forming one side-wall of the vertical chute. In order to accommodate the apparatus to different height bottles passing through the filling machine, I provide an extension 100 which is adjustably secured to the lower end of the vertical section 93a of the chute. This extension is rectangular in cross section and telescopes the lower end of the section 93a, as shown in Figs 13 and 14. In order to maintain the extension 100 in adjusted position, I provide two lugs 101 thereon which are adapted to engage spaced apertures 102 in the plate 95, as desired. The extension 100 is held in adjusted position by a bifurcated clamp 103, having a handle 104 to which the spring arms 105 are attached. The cap support 57 is removably secured to the lower end of the extension 100 and is adjustable up and down therewith. The cap support 57 is open at the bottom thereof, as indicated at 106, and has the back wall 107 cut out, as indicated at 108. Arms 109 extend forwardly from the support beneath a swinging gate 110, which is pivoted to the front of the extension 100, as indicated at 111. The support 57 is made of weaker material than the extension 100 and is preferably somewhat flexible or resilient, such as rubber or any suitable plastic. It is removably secured to the extension 100, as indicated at 112. With this construction and arrangement of the cap support I eliminate possible damage to the chute by a misplaced bottle as it leaves the filling machine.

In Fig. 1 of the drawings I have shown my apparatus in conjunction with one form of a standard rotary filling and capping machine. The empty bottles are delivered on a conveyor 120, from whence they are transferred to the filling mechanism 98 by a rotating star wheel 121. Successive bottles are placed upon successive stools 122, which move in a circular path under suitable filling nozzles projecting downwardly from the tank 124. As the bottles are moved around upon the stools 122 they are filled by the time they reach a second star wheel 125, by which they are transferred from the filling mechanism to the capping mechanism 126. The cap support 57 is positioned in the path of the bottles as they are transferred from the filling mechanism to the capping mechanism. During this transfer the neck of the bottle engages a cap resting upon the cap support and as it continues moving the bottle pulls the cap out of the support and down over and about the mouth of the bottle, as shown in Fig. 13. The gate 110 is so positioned that it will not be engaged by caps during normal operation. However, if a cap should not be engaged properly by the bottle neck so that it will fall down over the bottle, the gate 110 will engage the top of the cap and move it into proper position upon the bottle.

After a bottle passes the cap applying station it passes into the capping mechanism with a cap loosely seated thereon. The capping mechanism 126 comprises a plurality of rotating stools 127 which receive the bottles, and a plurality of capping heads 128 which are adapted to fold and compress the pleated skirts of the cap and to seal them about the neck and pouring lip of the bottles. The capping heads 128 may be of any desired type which are adapted to fold and compress the cap skirts about the neck of the bottle and hold them under pressure until the adhesive band 15 cools and sets, thus retaining the skirts in clamped position about the bottle necks. One type of capping head suitable for this purpose is shown in the patent to Carl W. Goodwin, No. 2,325,160 dated July 27, 1943.

Standard capping machines are generally adapted to be adjusted for use with either quart, pint or half-pint bottles. When a machine is adjusted for the smaller bottles it is usually speeded up, as the smaller the bottles the less time it takes to fill them. With this in mind, I provide means by which the position of the switch 88 may be adjusted with respect to the cap applying station. With the arrangement shown, each bottle will initiate the release of its own cap. The switch 88a is so positioned with respect to the cap applying station that it will take substantially the same amount of time for a cap to be removed from the heater and delivered to the cap support 57 at the cap applying station as it takes the bottle to travel from the switch 88a to the cap applying station. Consequently, with smaller bottles, which travel faster, it is necessary to locate or position the switch 88a farther from the cap applying station than is necessary with larger bottles, which travel more slowly.

Under certain operating conditions it is necessary to warm or heat the chute 56, as otherwise the thermoplastic adhesive band may cool and set to such an extent as it is travelling down the chute 56 that it will not adhere properly about the neck of the bottle as it is clamped thereon. After the machine has been idle for some time, I find that it is advisable to pre-heat the chute 56 before putting the machine in operation. I have also found that under certain climatic conditions it is necessary to heat or warm the chute 56 during operation. For this purpose I provide a heater 130 and a blower 131 which is driven by a motor 132. The heater and blower are disposed adjacent the receiving end 91, of the chute 56, as shown in Figs. 1 and 2. The blower 131, when operating, draws air past the heater 130, where it is heated and forces it down into the chute 56 through an opening 133.

From the foregoing it will be apparent to those skilled in this art that I have provided a very simple and efficient mechanism for accomplishing the objects of my invention.

It is to be understood that I am not limited to the specific construction shown and described herein, as various modifications may be made thereto within the scope of the appended claims.

I claim:

1. In a device of the character described the combination of a reservoir adapted to hold a stack of hood caps having pleated skirts with a band of thermoplastic adhesive applied thereto, a heating chamber disposed in axial alignment with said reservoir at the upper end thereof into which the upper end only of said stack of caps extends with the remainder of said stack disposed below the influence of said heater, a cap supporting and applying means disposed in the path of moving bottles and operative to loosely apply caps to the mouths of successive bottles as they move thereby, a chute terminating at said cap supporting and applying means, a transfer mechanism operative to successively remove caps from the top of said stack and deposit them in said chute for delivery thereby to said cap supporting and applying means, and means operative to move said stack upwardly into said chamber as caps are successively removed from the top thereof by said transfer mechanism.

2. In a device of the character described the combination of a reservoir adapted to hold a stack of hood caps having pleated skirts with a band of thermoplastic adhesive applied thereto, a heating chamber disposed in axial alignment with said reservoir at the upper end thereof into which the upper end only of said stack of caps extends with the remainder of said stack disposed below the influence of said heater, cap supporting and applying means disposed in the path of moving bottles and operative to loosely apply caps to the mouths of successive bottles as they move thereby, a chute terminating at said cap supporting and applying means, a transfer mechanism operative to successively remove caps from the top of said stack and deposit them in said chute for delivery thereby to said cap supporting and applying means, and means operative to move said stack upwardly into said chamber as caps are successively removed from the top thereof by said transfer mechanism, said last mentioned means including a suspended weight which becomes progressively lighter as caps are successively removed from the top of said stack.

3. In a device of the character described the combination of a reservoir adapted to hold a stack of hood caps having pleated skirts and a band of thermoplastic adhesive applied thereto, a heating chamber disposed in axial alignment with said reservoir at the upper end thereof into which the upper end of said stack of caps extends, cap supporting and applying means disposed in the path of moving bottles and operative to loosely apply caps to the mouths of successive bottles as they move thereby, a chute terminating at said cap supporting and applying means, a transfer mechanism operative to successively remove caps from the top of said stack and deposit them in said chute for delivery thereby to said cap supporting and applying means, and means operative to move said stack upwardly into said chamber as caps are successively removed from the top thereof by said transfer mechanism, said last mentioned means comprising; a slide mounted to slide on a guide which is disposed parallel to said reservoir, a finger which is pivotally secured to said slide and extends through an elongated slot through the wall of said reservoir into engagement with the bottom of said stack, and means urging said slide upwardly on said guide.

4. In a device of the character described the combination of a reservoir adapted to hold a stack of hood caps having pleated skirts with a band of thermoplastic adhesive applied thereto, a heating chamber disposed in axial alignment with said reservoir at the upper end thereof into which the upper end of said stack of caps extends, cap supporting and applying means disposed in the path of moving bottles and operative to loosely apply caps to the mouths of successive bottles as they move thereby, a chute terminating at said cap supporting and applying means, a transfer mechanism operative to successively remove caps from the top of said stack and deposit them in said chute for delivery thereby to said cap supporting and applying means, and means operative to move said stack upwardly into said chamber as caps are successively removed from the top thereof by said transfer mechanism, said last mentioned means comprising; a slide mounted to slide on a guide which is disposed parallel to said reservoir, a finger which is pivotally secured to said slide and extends through an elongated slot through the wall of said reservoir into engagement with the bottom of said stack, and gravity-operated means attached to said slide and normally urging said slide upwardly on said guide, said gravity-operated means including a suspended weight which becomes progressively lighter as said slide is moved upwardly on said guide.

5. In a device of the character described the combination of a reservoir adapted to hold a stack of hood caps having pleated skirts with a band of thermoplastic adhesive applied thereto, a heating chamber disposed in axial alignment with said reservoir at the upper end thereof into which the upper end of said stack of caps extends, cap supporting and applying means disposed in the path of moving bottles and operative to loosely apply caps to the mouths of successive bottles as they move thereby, a chute terminating at said cap supporting and applying means, a transfer mechanism operative to successively remove caps from the top of said stack and deposit them in said chute for delivery thereby to said cap supporting and applying means; and means operative to move said stack upwardly into said chamber as caps are successively removed from the top thereof by said transfer mechanism, said last mentioned means comprising; a slide mounted to slide on a guide which is disposed parallel to said reservoir, a finger which is pivotally secured to said slide and extends through an elongated slot through the wall of said reservoir into engagement with the bottom of said stack, and a chain which becomes progressively heavier from one end to the other end thereof, the lighter end of said chain being attached to said slide from whence said chain extends upwardly and over a sprocket disposed at the upper end of said guide and thence downwardly into engagement with a stationary support, said chain being operative to normally urge said slide upwardly on said guide with a progressively diminishing force as said slide is moved upwardly on said guide.

6. In a device of the character described the combination of a reservoir adapted to hold a stack of hood caps having pleated skirts with a band of thermoplastic adhesive applied thereto, a heating chamber disposed in axial alignment with said reservoir at the upper end thereof into which the upper end only of said stack of caps extends with the remainder of said stack disposed below the influence of said heater, cap supporting and applying means disposed in the path of moving bottles and operative to loosely apply caps to the mouths of successive bottles as they move thereby, a chute terminating at said cap supporting and applying means, a transfer mechanism operative to successively remove caps from the top of said stack and deposit them in said chute for delivery thereby to said cap supporting and applying means, means operative to move said stack upwardly into said chamber as caps are successively removed from the top thereof by said transfer mechanism, and means responsive to the passage of successive bottles past a given point for rendering said transfer mechanism operative to successively remove caps from the top of said stack and deposit them in said chute.

7. In a device of the character described the combination of a reservoir adapted to hold a stack of hood caps having pleated skirts with a band of thermoplastic adhesive applied thereto, a chamber disposed in axial alignment with said reservoir at the upper end thereof into which the upper end only of said stack of caps extends with the remainder of said stack disposed below the influence of said heater, means in said chamber adapted to project a band of radiant heat against the cap skirts to render said thermoplastic adhesive bands thereon soft and tacky in condition to secure the caps about the mouths and pouring lips of bottles, cap supporting and applying means disposed in the path of moving bottles and operative to loosely apply caps to the mouths of successive bottles as they move thereby, a chute terminating at said cap supporting and applying means, a transfer mechanism operative to successively remove caps from the top of said stack and deposit them in said chute for delivery thereby to said cap supporting and applying means, and means operative to move said stack upwardly into said chamber as caps are successively removed from the top thereof by said transfer mechanism.

8. In a device of the character described the combination of a reservoir adapted to hold a stack of hood caps having pleated skirts with a band of thermoplastic adhesive applied thereto, a chamber disposed in axial alignment with said reservoir at the upper end thereof into which the upper end only of said stack of caps extends with the remainder of said stack disposed below the influence of said heater, an annular row of electric light bulbs disposed about the upper end of said stack in said chamber and adapted to project a band of radiant heat against the cap skirts to render said thermoplastic adhesive bands thereon soft and tacky in condition to secure the caps about the mouths and necks of bottles, cap supporting and applying means disposed in the path of moving bottles and operative to loosely apply caps to the mouths of successive bottles as they move thereby, a chute terminating at said cap supporting and applying means, a transfer mechanism operative to successively remove caps from the top of said stack and deposit them in said chute for delivery thereby to said cap supporting and applying means, and means operative to move said stack upwardly into said chamber as caps are successively removed from the top thereof by said transfer mechanism.

9. In a device of the character described the combination of a reservoir adapted to hold a stack of hood caps having pleated skirts with a band of thermoplastic adhesive applied thereto, and means operative to move said stack upwardly as caps are successively removed from the top thereof, said last mentioned means comprising; a slide mounted to slide on a guide which is disposed parallel to said reservoir, a finger which is pivotally secured to said slide and extends through an elongated slot through the wall of said reservoir into engagement with the bottom of said stack, and a chain which becomes progressively heavier from one end to the other end thereof, the lighter end of said chain being attached to said slide from whence said chain extends upwardly and over a sprocket disposed at the upper end of said guide and thence downwardly into engagement with a stationary support, said chain being operative to normally urge said slide upwardly on said guide with a progressively diminishing force as said lug is moved upwardly on said guide.

HERBERT G. VORE.

REFERENCES CITED

The following references are of record in the file of this patent:

UNITED STATES PATENTS

| Number | Name | Date |
|---|---|---|
| 1,304,323 | Kaye | May 20, 1919 |
| 1,641,743 | Dawson | Sept. 6, 1927 |
| 1,905,615 | Wright et al. | Apr. 25, 1933 |
| 2,187,190 | Wilcox | Jan. 16, 1940 |
| 2,304,146 | Brinton | Dec. 8, 1940 |
| 2,325,086 | Vore | July 27, 1943 |
| 2,325,160 | Goodwin | July 27, 1943 |
| 2,325,163 | Goodwin | July 27, 1943 |
| 2,325,164 | Goodwin | July 27, 1943 |
| 2,325,168 | Vore | July 27, 1943 |
| 2,349,523 | Sonnenberg | May 23, 1944 |
| 2,397,297 | Sonnenberg | Mar. 26, 1946 |
| 2,422,750 | Rue | June 24, 1947 |